Sept. 10, 1935.    G. J. PANNECOUCKE ET AL    2,013,895
METHOD OF MAKING WHEELS
Filed May 31, 1932    2 Sheets-Sheet 1
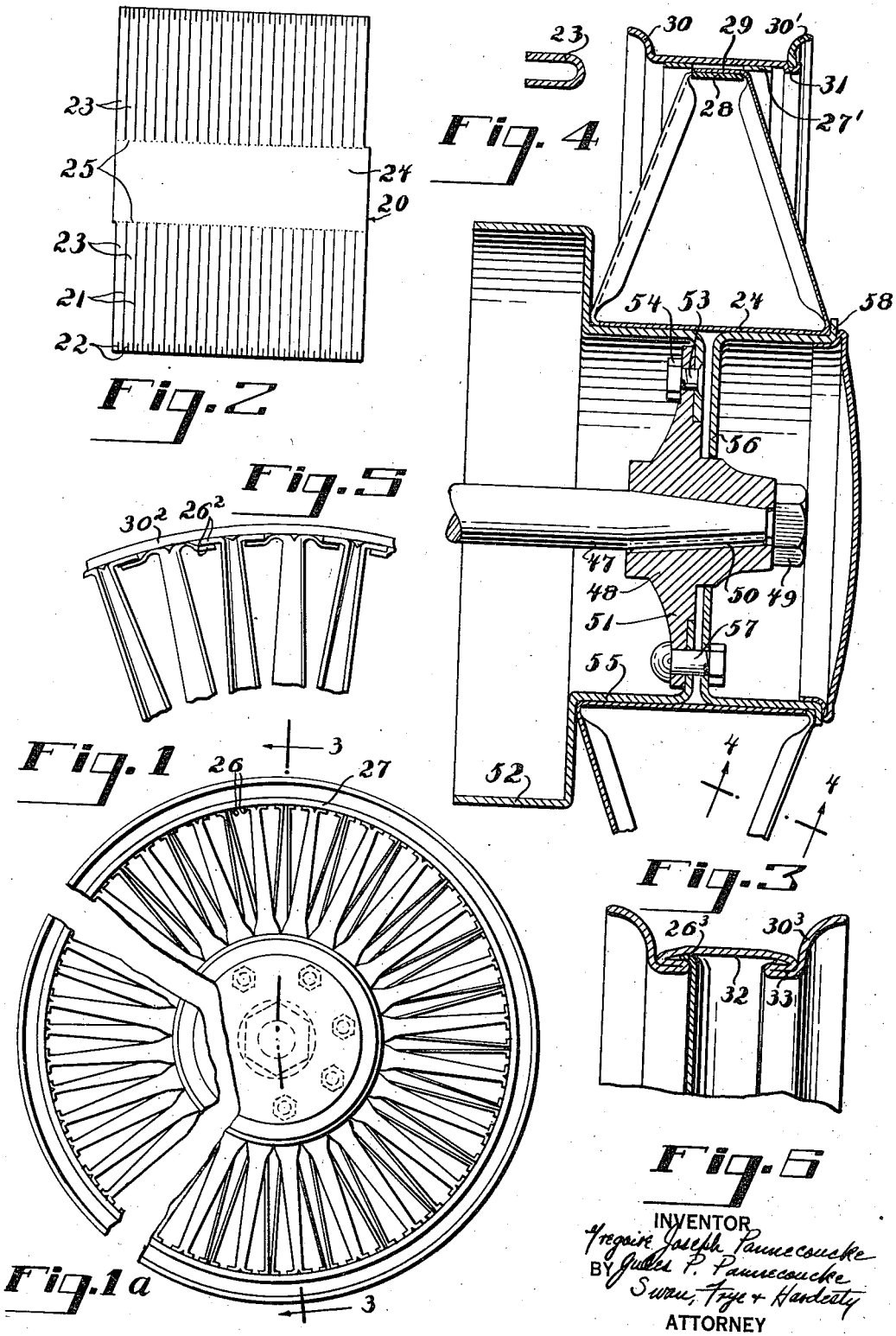

Sept. 10, 1935.   G. J. PANNECOUCKE ET AL   2,013,895
METHOD OF MAKING WHEELS
Filed May 31, 1932    2 Sheets-Sheet 2
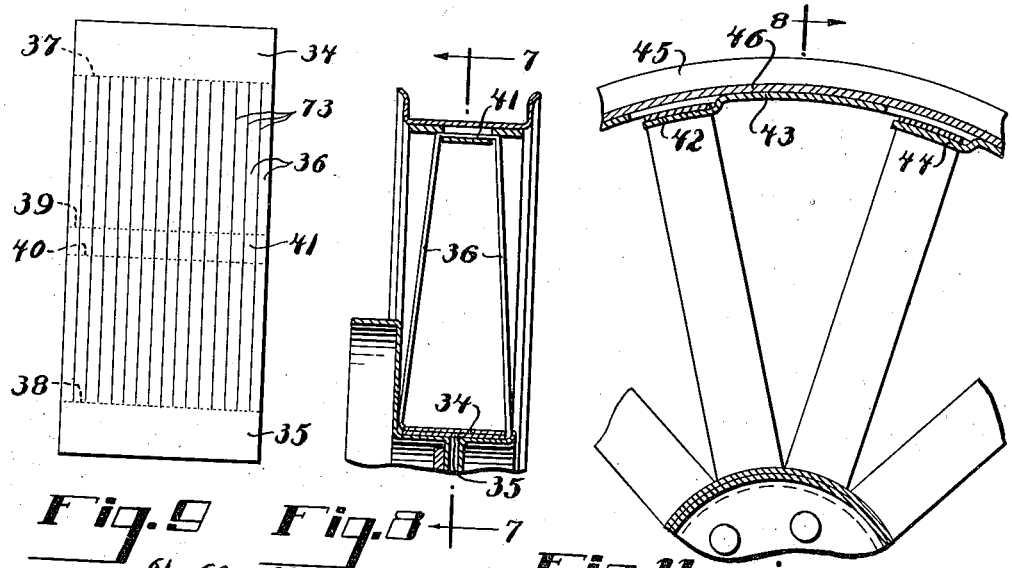
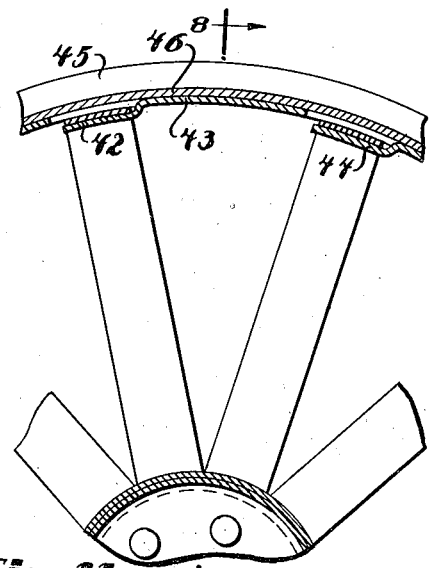
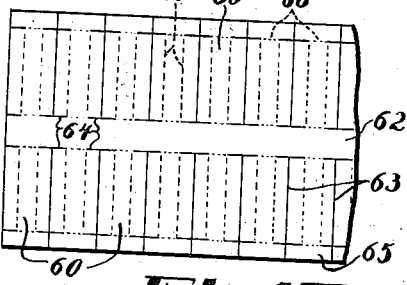
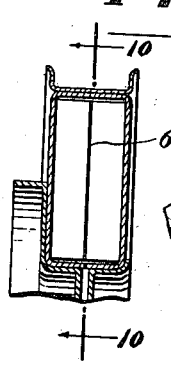
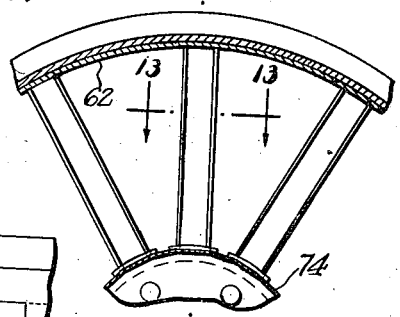
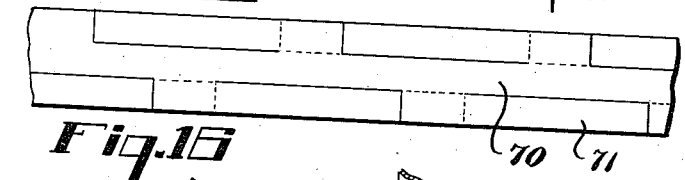
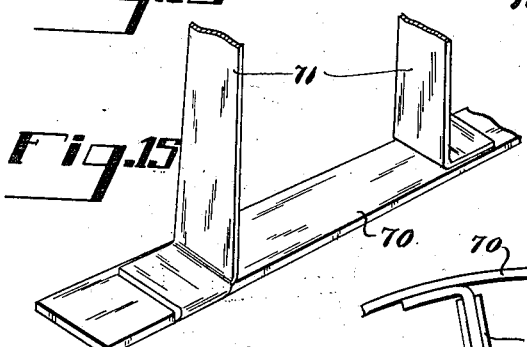
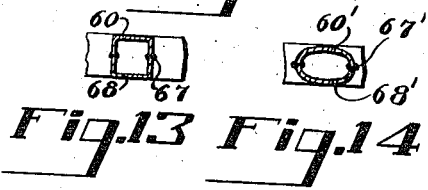
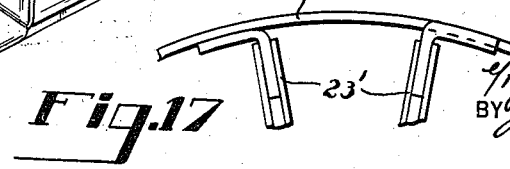

Patented Sept. 10, 1935

2,013,895

UNITED STATES PATENT OFFICE 2,013,895

METHOD OF MAKING WHEELS

Grégoire Joseph Pannecoucke and Jules P. Pannecoucke, Detroit, Mich.

Application May 31, 1932, Serial No. 614,360

2 Claims. (Cl. 29—159)

This invention relates to wheel constructions, and more particularly to an improved and simplified wheel, especially suitable for use upon automotive vehicles, and having for a primary object provision of a novel, simple, and very economical method of forming the same without waste from a single rectangular blank of sheet metal stock, being an improvement of a wheel structure disclosed in my copending application Serial Number 570,077, filed October 21, 1931.

Another object of this invention lies in the provision of improved means for securing a rim to the spokes of such a wheel.

The invention has for a further object the provision of an improved supporting and hub construction for such a wheel, and improved means for securing the wheel to the hub, the arrangement of which is such as to provide a structure of greater strength in proportion to its weight.

Still another object of our invention is the provision of a structure enabling the integral formation of the spokes and hub of a wheel without waste from a single blank of sheet metal in such manner that the spokes may be of almost any desired form, shape and size.

Other objects and advantages will be apparent from the following description wherein reference is made to the accompanying drawings illustrating preferred embodiments of our invention, and wherein similar reference numerals designate similar parts throughout the several views.

In the drawings:

Figure 1 is a side view partly broken away, of one form of wheel embodying the principles of our invention;

Figure 1a is a fragmentary view similarly looking at the side of a wheel of somewhat modified form;

Figure 2 is a plan view of a sheet metal blank from which a wheel of either of the types shown in Figures 1 and 1a may be formed, showing the manner in which the same is cut and also indicating the locations of the lines upon which its component parts are folded;

Figure 3 is a view corresponding to a vertical section taken substantially on the line 3—3 of Figure 1 and looking in the direction of the arrows, but showing a somewhat modified method of securing the spokes to the rim, and with the lower portions of the wheel broken away;

Figure 4 is a detail sectional view taken substantially on the line 4—4 of Figure 3 and looking in the direction of the arrows;

Figure 5 is a fragmentary side view of a somewhat modified wheel construction, showing a different method of securing the spoke ends to the felloe or rim of the wheel;

Figure 6 is a fragmentary diametrical sectional view of the rim and adjacent portions of a wheel, showing another modified manner in which the spokes may be secured to the rim;

Figure 7 is a fragmentary vertical sectional view, taken substantially on the line 7—7 of Figure 8 and looking in the direction of the arrows, on a plane substantially perpendicular to the axis and centrally through a somewhat modified wheel construction embodying the principles of our invention;

Figure 8 is a fragmentary diametrical section taken substantially on the line 8—8 of Figure 7 and looking in the direction of the arrows;

Figure 9 is a plan view of the blank from which the spokes and hub of a wheel of this type may be formed, indicating the manner in which the same is stamped and folded;

Figure 10 is a fragmentary vertical sectional view similar to Figure 7 of another somewhat modified form of our invention, taken substantially on the line 10—10 of Figure 11;

Figure 11 is a fragmentary vertical section similar to Figure 8, taken at right angles to Figure 10 and substantially on the line 11—11 thereof;

Figure 12 is a fragmentary plan view of a portion of the blank from which wheels of this type are formed, also indicating the manner of stamping and folding the same;

Figure 13 is a detail sectional view taken on the line 13—13 of Figure 10;

Figure 14 is a view similar to Figure 13 but showing a somewhat modified spoke formation;

Figure 15 is a perspective view showing a unitary felloe and spoke securing member construction suitable for use in conjunction with wheels of the type shown in Figures 1 through 4;

Figure 16 is a fragmentary view of the sheet metal blank from which we preferably form such a unitary felloe and securing member, also indicating the method of folding the same, and Figure 17 is a fragmentary side view of a wheel and felloe assembled by means of this member.

Referring now to the drawings: Reference character 20 designates generally a sheet metal blank, substantially rectangular in form, and the proportions of which are of course dependent upon desired dimensions of the finished wheel, although they may be substantially as shown in Figure 2. This sheet we preferably shear along lines 21 to separate the portions of which the spokes are formed, and each such spoke portion may at its end be cut inwardly for a short distance, as shown at 22, to assist in its securance to the felloe in a manner presently to be described, although this will be seen to be subject to variation. The spoke members 23 thus formed are bent at right angles to the portion 24 of which the hub is formed, upon dotted lines 25. Either before or after such bending, but preferably in the initial stamping operation, the spokes may be channeled, by bending each to U-section, as shown in Figure 4. The end portions of each spoke, which are divided by the short sheared lines 22, may be bent in opposite directions, as best shown in Figure 1 at 26 for convenient securance, as by welding or riveting, to the felloe or rim of the wheel. The spokes may be bent in a common direction substantially perpendicular to the hub portion 24 while the latter remains flat. These spokes may be bent through somewhat more than ninety degrees so that those upon opposite sides of the hub converge toward the rim, as shown in Figure 3, and upon bending the central hub portion 24 to cylindrical form the spokes are circumferentially spaced and assume the ordinary positions of the spokes of a wheel. The banks of spokes on each side of the hub may be offset relatively to each other, as shown in Figure 2, whereupon when the hub is bent to form the wheel, the spokes are staggered as viewed from the front of the wheel, as shown in Figures 1 and 1a. In Figures 1, 3 and 5 the spokes are shown inwardly channeled in opposite directions, although, as shown in Figure 1a, they may all be channeled toward the rear, or side of the wheel facing the vehicle, so that they appear smooth from the front.

In Figure 1 the ends of the spokes are shown secured to the felloe 27 by means of their oppositely circumferentially bent ends 26, which are welded, riveted or otherwise suitably secured thereto. The felloe is in this case a simple ring of flat metal. If desired these oppositely bent end portions may be elongated, as shown in Figure 5 at 26², and secured together by welding or riveting to form the felloe or rim.

If a separate felloe is used, instead of relying on welding or riveting, the spokes may be secured thereto in the manner shown in Figure 3, in which the spoke ends are laterally bent inwardly in a direction substantially parallel to the axis of the wheel and hooked in the inwardly punched portions 28 of the felloe 27'. These inwardly punched portions in which the ends of the spokes are hooked may be circumferentially spaced about the felloe, one being adapted to receive each inwardly bent spoke end 29, which may be welded in position.

In Figure 6 is shown another somewhat variant method of securing the ends of the spokes, in which the rim 30³ is formed with an inwardly opening groove 32 having overhanging edges, which may be formed in the rim by rolling the sheet metal stock in the manner shown in the figure. The outer end of each spoke is flared, as at 26³ to form a head which is hooked in the sides of the groove, one double bent portion, as 33, of the rim being rolled to that position to secure the spokes only after the latter are in position. Whether or not a felloe be used, if the rim is of the drop center or equivalent type it may be permanently fastened on the wheel. Otherwise any suitable demountable means may be provided. In the rim 30 shown in Figure 3 the front flange 30' is shown as removably held by a channel 31 in the body of the rim, in a well known manner.

One suitable manner in which the wheel may be secured upon the rear axle (47) of a vehicle is shown in Figure 3. The master hub 48 is shown secured upon the tapered end of the axle by means of a nut 49. The hub is keyed to the axle as at 50 and carries a radially extending flange 51 to which the brake drum 52 is secured, as by bolts 53 and nuts 54. As shown in the drawings, the brake drum, which is pressed of sheet stock, is formed with an outwardly extending boss 55 which enables the wheel-supporting flange 51 of the hub to be positioned approximately centrally of the wheel. The boss 55 is of such diameter that the outer hub portion 24 of the wheel slides smoothly thereover. The wheel is secured in position by the cupped retaining and reinforcing member 56, which is bolted to the flange 51 by bolts 57 spaced alternately between the bolts 53. The outer surface of the supporting member 56 is of substantially the same diameter as the boss 55 carried by the brake drum, and it may be formed with a radial flange 58 at its outer edge, which serves to retain the wheel in position and reinforce the bend at the end of each spoke, and may be permanently secured in the hub of the wheel or left loose as desired. The shoulder formed by the meeting of the boss portion 55 and the larger drum portion proper of the brake drum of course similarly reinforces the bends at the inner ends of the rear spokes.

In Figures 7 through 9 we have shown a somewhat modified form of our invention in which the hub and spokes are also formed integrally, the manner in which the stock is cut to form the spokes being clearly indicated by the solid lines 73 in Figure 9. The two end portions 34—35, when the blank is folded, form the hub of the wheel, overlapping as shown in Figure 8, while the spokes are formed by the radially extending looped strips 36, the radial disposition of the spokes of course resulting from bending the hub portion of the folded assembly to cylindrical form in a manner analogous to the bending of the hub portion of the first described embodiment of our invention. The hub portions are laterally bent substantially perpendicularly to the spoke portions upon dotted lines 37—38, and the spokes are also bent into closed loops with flattened ends by folding them upon dotted lines 39—40. The portions 41 of each spoke between these last mentioned dotted lines serve to connect the ends of the oppositely aligned spokes. They may be hooked in circumferentially opening struck-in teats 42, punched in the felloe 43, to the metal of which the spoke ends 41 are welded to secure them in position, as at 44. The overlapped portions 34—35 which form the hub of the wheel, may also be welded together, although the manner in which the various parts are secured is of course relatively immaterial. The rim 45 is shown welded as at 46 to the felloe, although it will be seen that here again the rim might be directly secured to the spoke ends, or demountably arranged upon the felloe in the usual or any other desired manner. The hub structure may be similar to that described in connection with Figure 3, or of any other desired design adapted to provide a suitable support for the outer hub formed by the overlapping portions 34—35.

Figures 10, 11 and 12 similarly illustrate another somewhat modified form of our invention in which closed spokes, which may if desired, be contoured similarly to the wooden spokes of an artillery wheel, are formed by bending in the sides of the oppositely positioned spoke portions 60, as upon the dotted lines designated 61 in Figure 12. In a wheel construction formed of a blank stamped and formed in the manner shown in these views, the spoke portions project in aligned relation from the uncut central portion 62 of the blank, which in this case forms the rim or felloe when the wheel is bent to finished form, although it will be seen that the central portion 62 might if desired be made to form the hub, while the spokes could project outwardly therefrom in a manner analogous to the arrangement of the parts of the wheels previously described. We prefer in wheels of this type however to form the spokes integrally with the rim, because when so formed more stock is available, proportionately, for forming the sides of the spokes. At the ends of the cuts 63 which separate the spoke portions, transverse cuts 64 are made to enable folding inwardly the sides of the spokes about the dotted lines 61 in the manner described, while the end portions 65, each of which also meets the similar piece carried by the opposed spoke portions 60 forming the other half of the spoke, are folded at right angles about the lines 66 to form flanges by which the spokes may be fastened to the hub 74, or of which flanges the hub may be partly or entirely formed. The edges which meet to form the closed tubular spokes may be seam-welded or otherwise suitably secured together, as at 67 (note Figures 11 and 13). The inbent sides of the spokes formed by bending them longitudinally of the spokes at right angles to their outer surfaces along the lines 61 are designated 68. As shown in Figure 14 tubular spokes so formed may be contoured elliptically in cross section, so that they more nearly resemble the more common form of wooden wheel. The several parts shown in this view have been designated by reference characters similar to those used in Figures 10 through 13, but with prime exponents, and it will be seen that the only difference need be the manner in which the spokes are bent about their longitudinal axes.

As stated above, any suitable means might be used for securing a felloe or rim itself directly to the ends of the spokes. Another efficient means of securing spokes such as those shown in Figures 1 through 5 to a rim or felloe, is shown in Figures 15 to 17 inclusive, in which the annular felloe or rim-supporting portion 70 is formed integrally with radially inwardly projecting portions 71 which may be inserted and welded or riveted within the channeled ends of the spokes, which latter are shown in Figure 17 designated 23'. The manner in which the inwardly extending portions 71 are cut from the continuous strip stock of which the felloe is formed is clearly indicated in Figure 16, while Figure 15 shows my preferred method of folding these strips.

If desired a very economical wheel construction may be formed in similar manner by cutting the portions 71 of such length that they form the spokes of the wheel and are secured directly in the hub or contoured to form the hub itself in any suitable manner. It will be seen that this modification may easily be effected by elongating the portions 71 to the desired spoke length, but that the strength of the construction, other things being equal, will be less than that of a wheel having tubular or channeled spokes formed in any of the manners described in connection with the preferred embodiments heretofore disclosed.

While we have shown these various wheel structures formed almost entirely of one piece, we contemplate as within the scope of our invention, wheels similarly formed of individual parts secured together in any suitable manner. It will be seen that this method of construction might also be followed without wastage of stock.

While it will be apparent that the illustrated embodiments of our invention herein disclosed are well calculated to adequately fulfill the objects and advantages herein stated, it is to be understood that the invention is susceptible to variation, modification and change within the spirit and scope of the subjoined claims.

What we claim is:—

1. The process of forming a wheel which comprises cutting a substantially rectangular blank of sheet stock along a plurality of substantially parallel lines, projecting outwardly oppositely from a substantially rectangular central uncut area, transversely cutting inwardly the strips between such parallel cuts on opposite edges to form edge flaps extending the length of each such strip, bending the central uncut portion to substantially cylindrical form, to form a hub, in such manner that the strip portions separated by the parallel cuts project radially outwardly therefrom to form spokes, and bending inwardly toward each other the edge flaps of opposite spoke portions to combine each opposite pair into a single enclosed spoke.

2. The process of forming a wheel which comprises cutting a substantially rectangular blank of sheet stock along a plurality of substantially parallel lines stopping short of its edges, bending the cut portions along a transverse line until the uncut portions at opposite ends of the cut lines overlap to form a hub portion of double thickness, and bending the overlapping uncut portions to substantially cylindrical form, to form a hub, in such manner that the portions separated by the parallel cuts project radially to form spokes.

GRÉGOIRE JOSEPH PANNECOUCKE.
JULES P. PANNECOUCKE.